April 12, 1932.                L. F. MOODY                1,853,139
                            HYDRAULIC TURBINE
                    Filed March 2, 1928        8 Sheets-Sheet 1

INVENTOR
LEWIS F. MOODY
BY
            ATTORNEY

April 12, 1932.  L. F. MOODY  1,853,139
HYDRAULIC TURBINE
Filed March 2, 1928  8 Sheets-Sheet 4

INVENTOR
LEWIS F. MOODY
BY
*Edward A. Hathaway*
ATTORNEY

April 12, 1932.　　　　　L. F. MOODY　　　　　1,853,139
HYDRAULIC TURBINE
Filed March 2, 1928　　　　8 Sheets-Sheet 6

INVENTOR
LEWIS F. MOODY
BY
ATTORNEY

April 12, 1932.　　　　　L. F. MOODY　　　　　1,853,139
HYDRAULIC TURBINE
Filed March 2, 1928　　　8 Sheets-Sheet 7

INVENTOR
LEWIS F. MOODY
Edward A. Hutchins ATTORNEY.

Patented Apr. 12, 1932

1,853,139

UNITED STATES PATENT OFFICE

LEWIS FERRY MOODY, OF PHILADELPHIA, PENNSYLVANIA

HYDRAULIC TURBINE

Application filed March 2, 1928. Serial No. 258,530.

This invention relates to hydraulic turbines and particularly to turbines of high specific speed provided with adjustable runner blades, one object of the invention being to provide improved operating means for adjusting the blades and improved means for supporting the same.

A further object is to provide operating means which will be efficient and certain in operation, and so constructed that the operating parts will be particularly effective in resisting wear which tends to be created due to the relatively large hydraulic forces acting upon the runner blades. A further object is to provide means for operating the adjusting mechanism either by fluid pressure or mechanically, or both, and also to provide improved means whereby the runner blades will assume simultaneously the same relative adjusted position and to have means for positively holding the same in their various adjusted positions.

More specifically an object is to provide an operating mechanism in which the relatively moving parts will have surface contact throughout operation, thereby being subjected to a minimum of wear.

The foregoing and other objects and advantages of my invention will be more apparent from the following description and accompanying drawings in which Fig. 1 is a vertical, partially sectional view of a turbine embodying my invention, Fig. 2 is a horizontal fragmentary section taken substantially on the line 2—2 of Fig. 1.

Fig. 10 is a partial sectional view of one form of fluid means for adjusting the blades, parts being broken away to show details of construction.

While my present invention has been shown in connection with a high specific speed turbine, yet it will be understood that the invention is applicable to any other type of turbine where adjusting and operating mechanism is desired, although the mechanism herein described is particularly applicable to a high specific speed turbine of the type employing a runner 1 which carries, by a hub 2, outwardly-extending relatively flat blades 3, pivotally mounted in the hub. The hub has an outer wall and a hollow interior 4 provided with a partition 5 to which a hollow turbine shaft 6 is connected by a suitable flange and bolt arrangement 7, the turbine shaft thus terminating at the partition 5, thereby leaving the chamber 4 entirely free for containing substantially only the blade operating mechanism and the light grease or other lubricant used. The wall of the runner hub is preferably of such contour as to be a continuation of the inner surface 8 of a head-cover structure 9, which forms in combination with the lower distributing ring 10 a continuation of a radial inflow passage 11, turning through a transition space 12 to direct the water in an axial direction and into a draft tube 13 after passing through the runner 1. Suitable angularly disposed stay vanes 14 and adjustable guide vanes or wicket gates 15 are disposed in the radial inlet to impart whirl to and control the flow to the runner.

Figure 26:
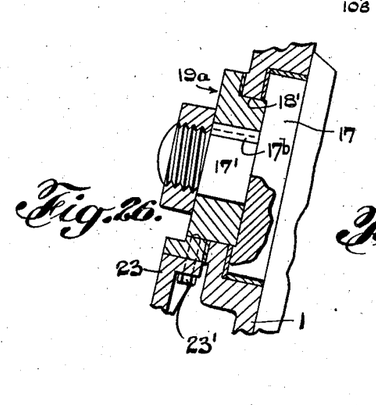
Figs. 26 and 27 are modifications showing how the operating levers may be secured to the blades.
Figure 27:
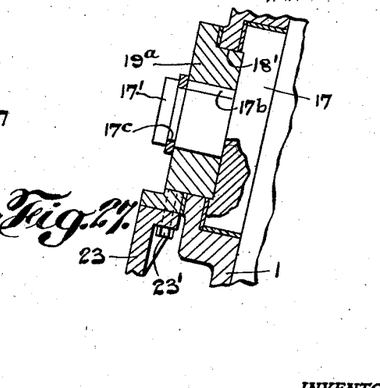

The runner herein shown has six blades, although the number may vary in accordance with operating conditions for any particular plant, but in general a relatively small number of blades will be employed. Each blade is provided with a circular disc 17 rotatably supported by the peripheral bearing surface of a circular recess 18 formed in the wall of the runner hub. To prevent outward displacement of the runner blade so that the blade tips will be maintained a relatively fixed distance from the outer wall of the draft tube 13 during various adjusted positions, there is provided a combined retaining plate and operating member 19 having a sleeve disposed in a reduced opening 18' extending inwardly from recess 18, which sleeve receives a centering stub shaft 17' carried by disc 17 to which member 19 is secured as by bolts 20. The retaining plate has a flange the outer radial surface of which overhangs and engages the inner surface of a wall 21 of the recess 18. Certain of the bolts will have a reamed fit with member 19 while the remainder will have a loose fit, although in an equivalent construction instead of using any bolts 20 at all, shaft 17' is extended, Fig. 26, and threaded to receive a nut 17a engageable with the back side of plate 19a to hold the same in place while keys such as 17b may be interposed between shaft 17' and plate 19 to transmit operating torque. Also if desired, Fig. 27, there could be used a circular key 17c fitted in a groove formed in shaft 17' on the outside of plate 19.

Figures 3, 4, 5, 11, 12:
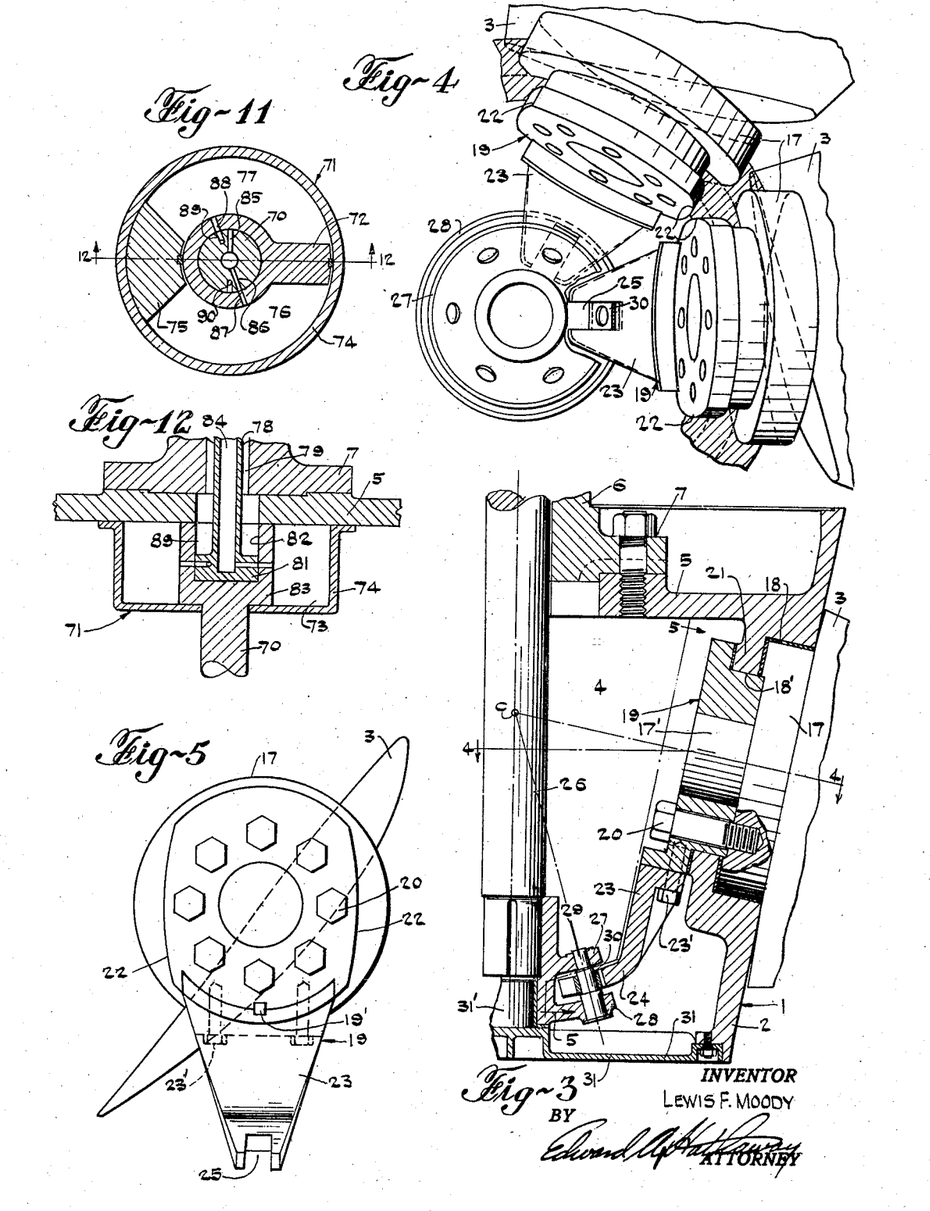
Fig. 3 is an enlarged fragmentary vertical section of a runner hub carrying an adjustable blade and the operating means therefor.
Fig. 4 is a partial sectional view showing two runner blades and taken substantially on line 4—4 of Fig. 3, parts being broken away to show details of construction.
Fig. 5 is a vertical view looking toward the inner end of the runner blade and taken substantially on the line 5—5 of Fig. 3.
Fig. 11 is a horizontal section of the blade operating motor shown in Fig. 10 and taken substantially along the line 11—11 of Fig. 10.
Fig. 12 is a central vertical section taken substantially on the line 12—12, Fig. 11.

As shown in Fig. 4 due to having the successive blade mechanisms compactly arranged, the adjacent edges 22 of the plates 19 are somewhat flattened although this may be varied or eliminated in accordance with the degree of compactness. The remaining portion of these plates is substantially circular, each having either an integral or removable arm 23 extending downwardly in a tapered formation as shown in Fig. 4 and provided at its lower end with a short substantially radially-extending arm 24. Each one of the arms 23, due to its tapered formation, lies in relatively close juxtaposition, while each of the arms 24 is provided with a slot 25 having parallel opposed vertical surfaces. The arms 23 are held in operative relation to retaining member 19 by bolts 23' passing through a suitable flange on arm 23 and being threaded in member 19 and an axial key 19'. This arrangement permits all the blades and retaining members to be assembled without interference of any arms 23, after which said arms may be easily and securely placed in position.

To actuate the blades through these arms, there is mounted upon an operating shaft 26, which preferably extends down through the hollow portion of the turbine shaft, a central hub having spaced flanges 27 and 28 which together form a fork for receiving arms 24. Supported by each flange 27 and 28 is a pivot pin 29 pivotally carrying a block 30, the sides of which are parallel and engage, with surface contact, the sides of the slot 25. This arrangement is duplicated for each blade and the arrangement is such that the axis about which the blade is adjusted and the axes of the pivot pin 29 and the shaft 26 meet at a single point C and thus permit oscillations of the shaft 26 to impart corresponding movements to the runner blades without any binding between the surfaces while at the same time the surfaces are maintained in their normal operating and close-fitting relation, it being understood that the flanges 27 and 28 are suitably spaced apart to permit arms 24 to move relative to the axis of pins 29 and the slots 25 are of sufficient length that blocks 30 can move along the same. The hole in each block 30 is just of sufficient size to have close operative contact with the pin 29, thus maintaining throughout the whole device a surface contact.

Due to the surface contact minimum of wear will result, thus also minimizing the possibility of chattering or other disturbing abnormal conditions and eliminating need for clamping or similar devices. The lower end of the interior chamber 4 has a closure member 31, bolted or otherwise secured to the outer wall, and this closure member also preferably carries a suitable bearing rest 31' for supporting the lower end of the operating shaft 26.

Various mechanisms may be employed for operating the shaft 26, but in the preferred form the same is mechanically operated by housing the actuating mechanism in the coupling 32 which connects the turbine and generator shafts, thus providing not only a very compact arrangement but one which is also easily accessible.

Figures 6, 7, 9:
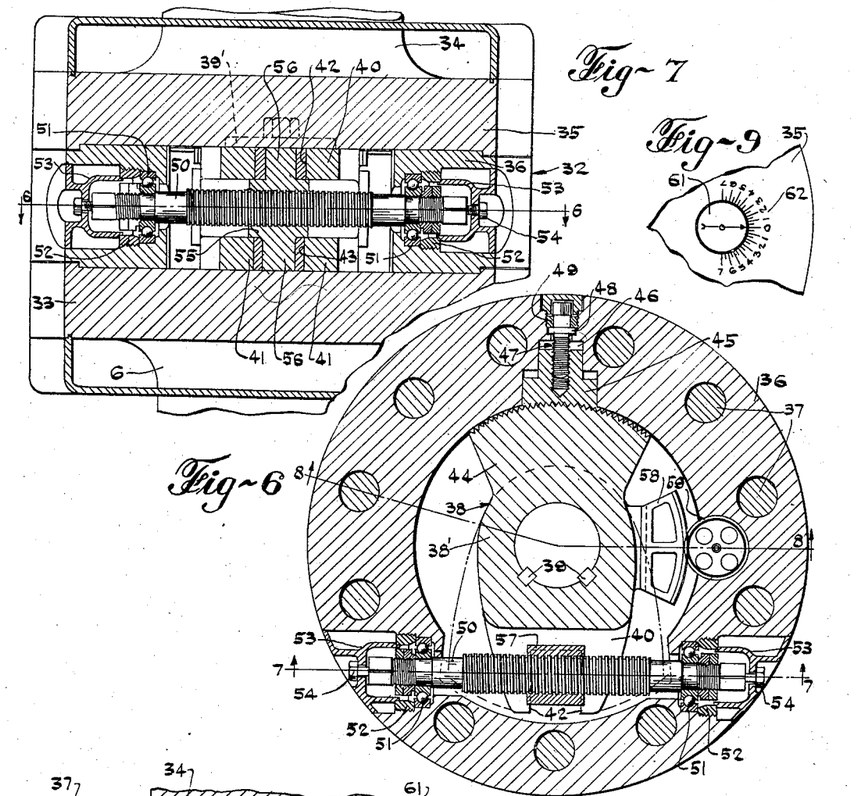
Fig. 6 is a horizontal section taken substantially on line 6—6 of Figs. 1 and 7, parts being shown in elevation for clearness.
Fig. 7 is a vertical sectional view taken substantially on the line 7—7 of Fig. 6, parts also being shown in elevation for clearness.
Fig. 9 is a fragmentary plan view of the blade-position indicator.
Figure 8:
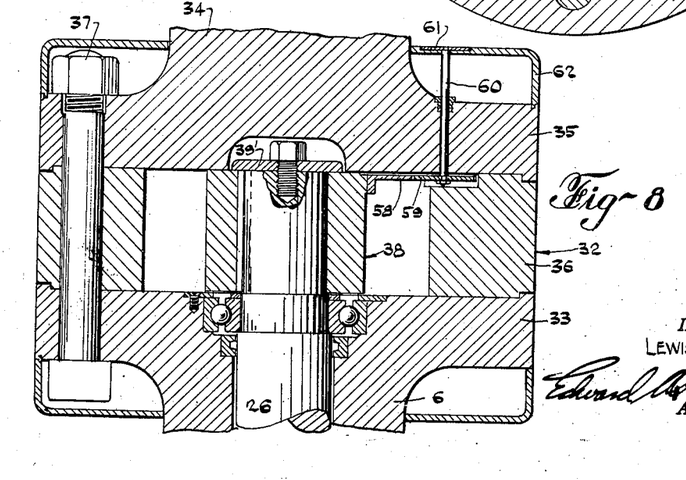
Fig. 8 is a central vertical section taken substantially on line 8—8 of Fig. 6.

As shown in Figs. 6 to 8, the turbine and generator shafts 6 and 34 have flanges 33 and 35 spaced by a ring 36 and held together by a series of circumferentially spaced bolts 37. Disposed within the hollow interior of spacing ring 36 is a combined operating arm and locking member 38 secured to the upper end of the operating shaft 26, as by keys 39 and a holding plate 39'. The member 38 has a central hub portion from which extends a pair of vertically spaced arms 40 and 41, each provided with vertically aligned slots 42 and 43, and a locking segment 44, the periphery of which has teeth engageable by a toothed block 45 slidable in a slot 46 formed in spacing ring 36. Actuation of locking block 45 is by rotation of a bolt 47 screw-threaded in block 45 and rotatably supported in ring 36 by an integral rotatable collar 48 and a stationary nut 49 which is threaded in a suitable recess of member 36, the outer end of the bolt 47 being provided preferably with a square head for engagement by a suitable wrench for actuation.

To actuate arms 40 and 41 a screw 50 is rotatably supported in the ring 36 as by bearings 51, these being held in their recesses by collars 52 threaded in ring 36. Also resting upon collars 52 are suitable housings 53 which serve, in combination with a bolt 54, threaded in the ends of the screw 50, as a means for locking and housing the ends of the screw which are preferably squared for receiving a suitable wrench for rotating the same. A nut 55, threaded on screw 50, has oppositely extending stub shafts 56 carrying pivotal blocks 57 guided by the walls of the slots 42 and 43.

To indicate the position of the blades or adjusting mechanism a segmental gear 58, carried by member 38, meshes with a gear 59 mounted upon the lower end of a shaft 60 which is journaled, preferably in flange 35, the upper end of shaft 60 carrying a disc 61 set within a recess formed in a cover 62 for the ends of bolts 27. Disc 61 has an arrow pointing to position indices 62 running in opposite directions from a zero position, which indicates the normal operating position of the runner blades.

In operation of the device thus far described, when it is desired to change the position of the runner blades which may be occasioned by a change in operating conditions, the turbine is first shut down by closing the wicket gates 15 through usual operating mechanism which is well known in the art, after which locking block 45 is moved outwardly by actuation of bolt 47, whereupon locking bolts 54 are released and cover members 53 removed to permit placing a wrench upon the end of screw 50.

Upon actuation of screw 50, nut 55 moves along said screw, carrying blocks 57 therewith to cause angular movement of arms 44 and 41 and shaft 26 which cause pins 29, blocks 30 and slotted arms 24 to impart angular adjustment to blades 3, during all of which time all of the operating elements contained within the hub will have surface contact and can be held in any desired position without the need of locking mechanism except that employed in connection with the actuating screw 50. After the blades have been brought to their desired adjusted position as shown by the position indicator 61, locking block 45 will be moved inwardly to engage the teeth on member 44.

In the modification of Fig. 10 the arms 23 and disc 27 are identical in every respect with the preferred form, while a short operating shaft 70 is used terminating at a fluid motor 71 disposed within the hub chamber 4, the fluid connections and fluid control valve being the only means extending upwardly through the hollow turbine shaft. As shown in Figs. 11 and 12, shaft 70 carries an oscillating vane 72 disposed within a fluid chamber 73 formed by a circular cylinder 74 carried by and rotatable with partition 5. A fixed partition 75 carried by cylinder 74 forms chambers 76 and 77. A pressure supply pipe 78, spaced from the wall of an exhaust passage 79 extending through both the turbine shaft 6 and generator shaft 34, carries a valve head 81 rotatably disposed within a cylindrical recess 82 formed in a head 83 carried on the upper end of the operating shaft 70.

When ports 86 and 87, formed respectively in valve 81 and head 83, are in register, fluid pressure is supplied to chamber 76 from passage 84 in pipe 78 and fluid exhausts from chamber 77 by way of ports 88 and 89 and passage 79. This valve position causes counter-clockwise movement of vane 72, viewing Fig. 11. Reverse movement is obtained by having ports 85, 88 and 87, 90 in register.

The supply pipe 78 and valve head 81 can be rotated by any suitable mechanism disposed at the upper peripheral end of the generator shaft, through which pipe 78 extends, the fluid connections to both pipe 78 and exhaust passage 79 being by any usual swivel-packing device also disposed at the end of the generator shaft on top of the generator.

In operation: When the turbine is normally operating and the gates are in a fixed adjusted position, valve head 81 will be so disposed that passage 87 will be midway between passages 86 and 90, and passage 88 between passages 85 and 89, thereby preventing admission of fluid to or exhaust of fluid from chambers 76 and 77. If it is desired to adjust the gates by moving the piston partition 72 counter-clockwise, looking at Fig. 11, valve head 81 will be moved in a clockwise direction to the position shown in Fig. 11, whereupon fluid pressure from pipe 78 flows into chamber 76 through passages 86 and 87, and at the same time fluid in chamber 77 is discharged through passage 79 as by way of the connected passages 88 and 89. After these various ports are brought into communicating relation, if valve head 81 is then held stationary, piston 72 will continue to move in a counter-clockwise direction until passage 86 moves just out of communication with the port 87, during which time exhaust port 89 will have moved just out of communication with port 88, thereby preventing both discharge of fluid from chamber 77 and admittance of fluid to chamber 76. If it is desired to adjust the blades 72 a considerable amount, valve head 81 can be moved along with the movement of piston 72 thereby keeping passages 86, 87, 88 and 89 in communication with each other; but as soon as movement of valve head 81 ceases, piston 72 will continue to move only a sufficient distance to overrun the passages 86 and 89. Reverse operation of valve 81 is followed when it is desired to move piston 72 in a clockwise direction.

Figure 13:
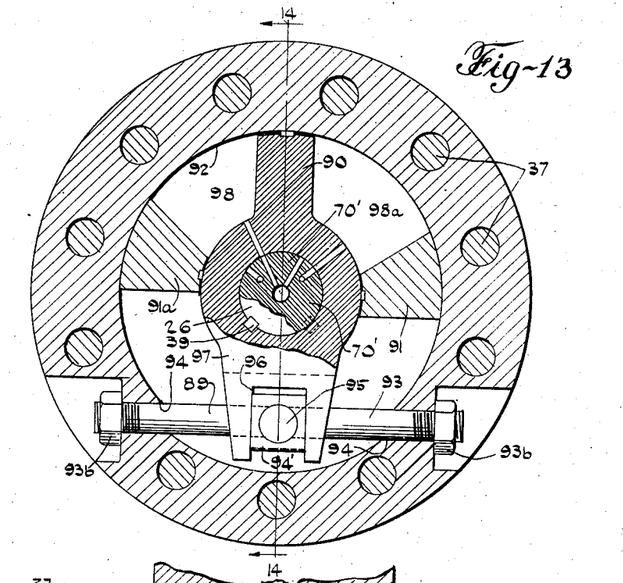
Fig. 13 is a horizontal section of a further modification showing combined fluid operated and mechanical means for actuating the adjusting mechanism.
Figure 14:
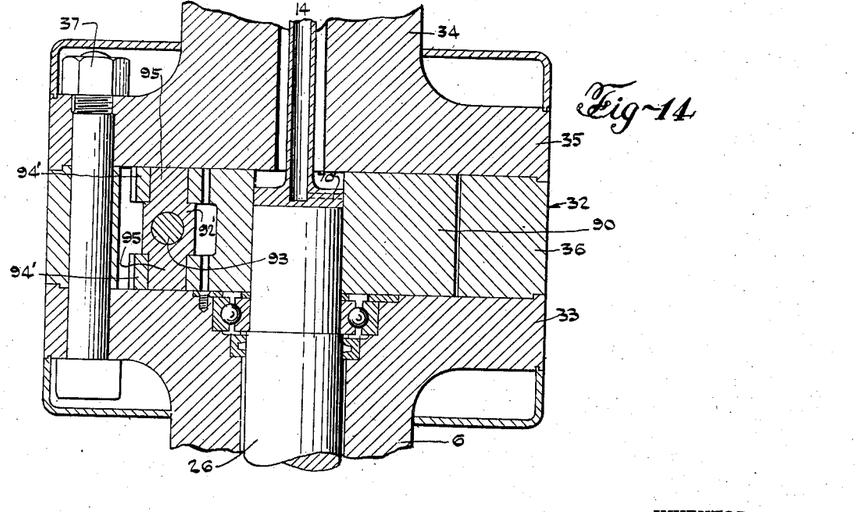
Fig. 14 is a vertical section taken substantially on the line 14—14 of Fig. 13.

In the form of Figs. 13 and 14, a combined fluid and mechanical actuating means is shown as employing an oscillating piston vane 90 movable between two partitions 91 and 91a, all of which is disposed within and removably secured to the inner circular periphery of a spacing ring 92 disposed between the coupling flanges 33 and 35. The operating shaft 26 is located and operated in a manner similar to that shown in the preferred form. The mechanical operating mechanism has a rod 93 slidably carried in openings 94 and held in adjusted axial positions only by nuts 93B threaded thereon, while a pair of blocks 94' pivoted on pins 95 carried by a block 92' which is rigidly secured to rod 93, are slidably disposed in slots 96 formed in operating arms 97 and 97a similar to the two arms 40 and 41 in the preferred form.

To supply and exhaust fluid from the motor chambers 98 and 98a, a fluid passage and port arrangement similar to that shown in Fig. 11 is disposed in the upper side of the hub carrying the arms 97 and vane 97a, with the exception that the ports in the valve mechanism 70' are closer together due to the chambers 98 and 98a containing less than 360° as in Fig. 11. The structure, operation and fluid connections of this valve are similar to those shown in Fig. 11.

In operation, Fig. 13 may be actuated in several manners: First, solely as a fluid-actuated device which employs the mechanical mechanism merely as a locking device, it being noted that by loosening both nuts 93b and supplying fluid to either one or the other of chambers 98 or 98a the device can be freely moved by fluid pressure only; and after the desired adjustment has been obtained, both nuts can be tightened, thereby positively prohibiting further movement of piston 90. During this operation, if desired nuts 93b may be removed, leaving the device entirely under fluid control, or both the rod 93 and nuts may be removed. Second, the device can be operated solely in a mechanical manner in case the fluid-pressure supply is interrupted, in which case one or the other of the nuts 93b will be loosened, while the remaining nut will be moved in a tightening direction, thus causing rod 93 to be drawn over to one side or the other and likewise causing angular movement of the operating shaft 26. While, third, both modes of operation above mentioned can be combined if any circumstances should arise which would necessitate such.

Figure 15:
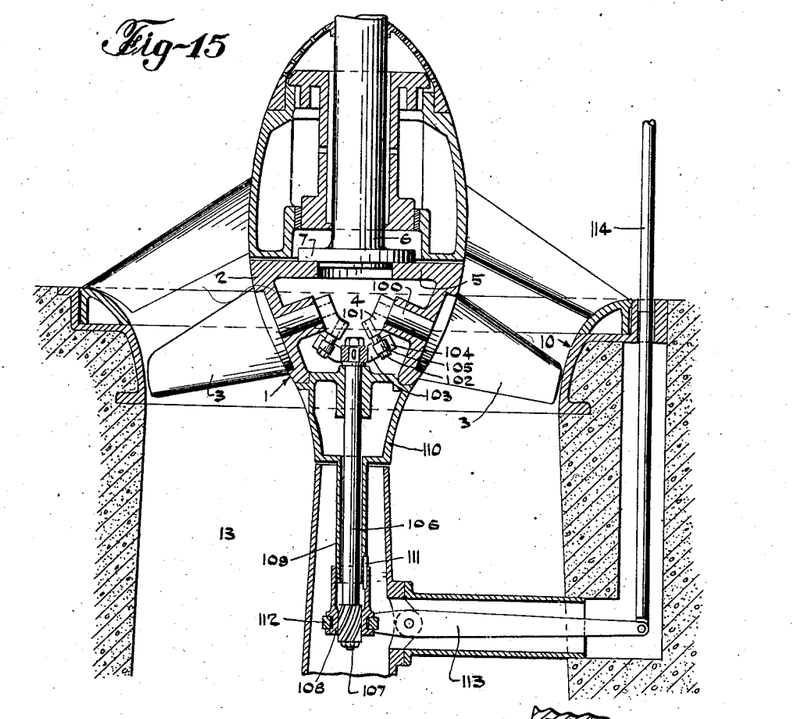
Fig. 15 is a vertical sectional view of a modified form of blade operating means.

In the modification of Fig. 15, the runner blades have shafts 100 journaled in suitable bearings formed in the runner hub, which shafts carry on their inner ends crank arms 101, which in turn carry studs 102. These studs carry either a roller or slide block which slidably engage the walls of radial slots 104 formed in a central rotating member 103 concentric with the runner axis. The axis of each stud 102 passes through the intersection of the axis of rotation of the blade and the turbine axis. The relative rotation of the rotating member 103 with respect to the runner will cause a corresponding rotary movement of each runner blade. To produce the relative rotary movement of the member 103 it is rigidly mounted on the rod 106 provided at its lower end with a screw member 107 of steep pitch. A nut member 108, mating with this screw member 107, moves slidably on the sleeve 109 extending downward from the runner hub cap 110 and is keyed against rotation with respect to the hub by the key and slot connection at 111. To turn the screw 107 and rod 106 with relation to the runner the nut member 108 is moved up and down by the floating sleeve 112 operated by the lever 113 from the governor rod 114. A vertical movement of the nut will correspondingly adjust the runner blades.

Figures 16, 17, 18:
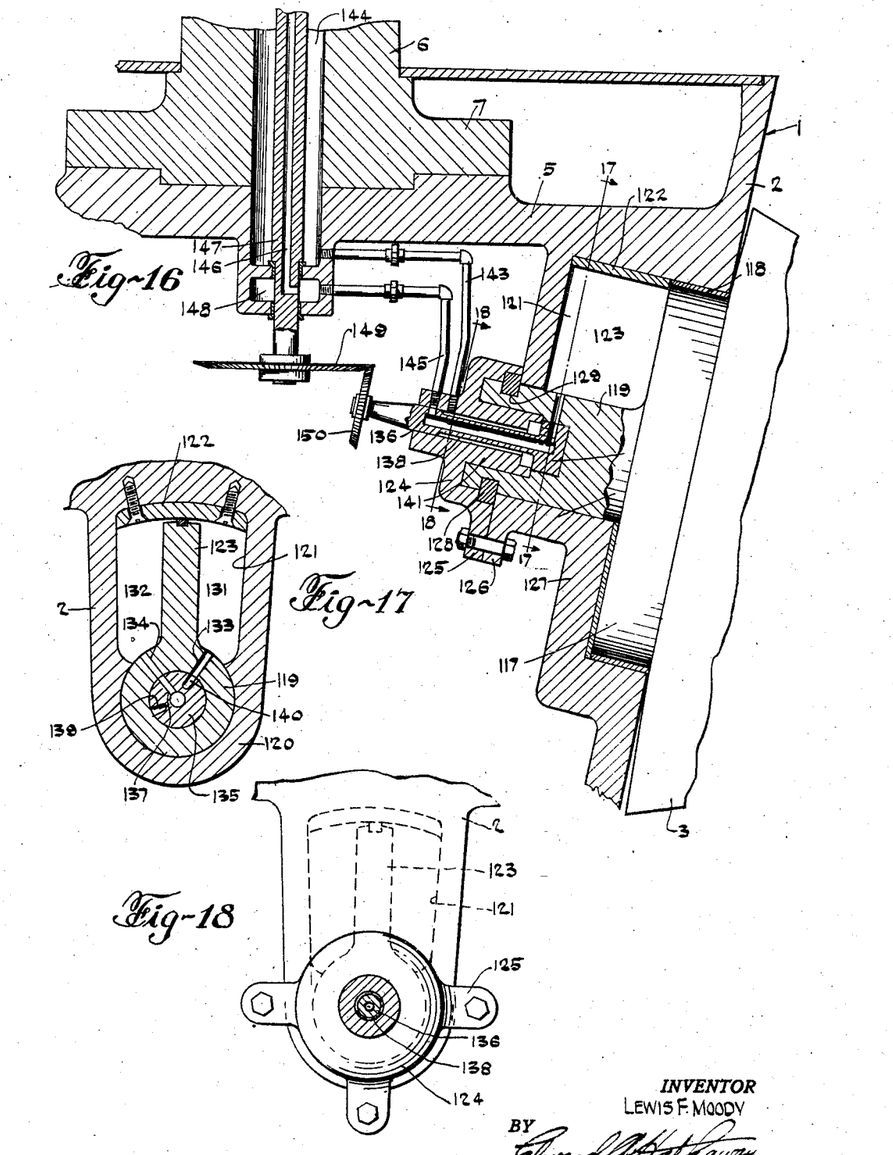
Fig. 16 is a further modified form of operating mechanism.
Figs. 17 and 18 are transverse sections taken, respectively, substantially on lines 17—17 and 18—18 of Fig. 16, Figs. 19 and 20 are respectively vertical and horizontal sections of a modification showing electric-motor actuating means for the blades.

In the modification of Figs. 16 to 18, each blade is provided with an individual servomotor, all of which are controlled by a central mechanism. The advantage of this arrangement is that the aggregate fluid pressure area on the pistons of the several servo-motors may be designed to be greater than the area of a single central servo-motor. In this form each blade has a cylindrical hub-like disc 117, disposed in a close-fitting circular recess 118, and a shaft 119 extending through a bearing 120. A fluid operating motor chamber 121 has a removable arcuate wearing plate 122. The servo-motors are of the oscillating-vane type, each having a vane 123 secured to disc 117 and shaft 119 either by being cast therewith, or removably secured thereto in any well-known manner. The free edges of vane 123 have close sliding contact with the walls of chamber 121 by using any suitable packing particularly between the vane and member 122. To hold the runner blade in axial position and also to provide means for supporting a controlling valve, a collar 124 has lugs 125 connected to lugs 126 formed on bearing 120. A split circular key 128 is held in an annular groove 129 by the collar 124 so that while the collar 124 remains stationary, still the shaft 119 and blade can rotate.

To control the fluid pressure to chambers 131 and 132 formed on opposite sides of vane 123, shaft 119 has ports 133 and 134, while a valve having a head 135 and stem 136 is provided with an exhaust passage and ports 137, and fluid supply passages including annular groove 138 and ports 139 and 140 formed in head 135. The valve is held in position by a sleeve 141 extending inwardly from collar 124 and overlapping the peripheral portion of head 135. A pressure supply pipe 143 connects the annular space 138 with passage 144 formed in the turbine shaft while an exhaust pipe 145 connects with a passage 146 in an operating rod 147 through a chamber 148. Rod 147 and stem 136 are connected by bevel gears 149 and 150.

Exhaust pipe 145 and the chamber 148 are disposed on the outside of the pressure connections to the annular passages 138 and 144, thereby causing any leakage from the high-pressure source along the outside of the valve stem 136 or the rod 147 to be discharged into a low-pressure area such as the exhaust pipe 145. This reduces to a minimum the possibility of leakage to the exterior.

Fig. 16 shows only one blade and its associated servo-motor and controlling mechanism, although it will be understood that the servo-motor and valve control for each blade will be identical to that shown in Fig. 16, and the bevel gear 150 of each valve control will mesh with the central gear 149.

In operation of this form to cause clockwise movement of vane 123, rod 147 will be actuated by any suitable mechanism at the top of the generator shaft, as previously explained, so as to cause exhaust port 140 to register with passage 133 and pressure-supply port 137 to register with passage 134. If valve head 140 is held stationary during servo-motor movement, passages 133 and 134 will overrun passages 137 and 140, thereby causing the servo-motor to stop at a predetermined position. To reverse the direction of blade movement the valve head 135 is rotated in a reverse direction so as to connect ports 139 and 134, and 137 and 133.

Figure 19:
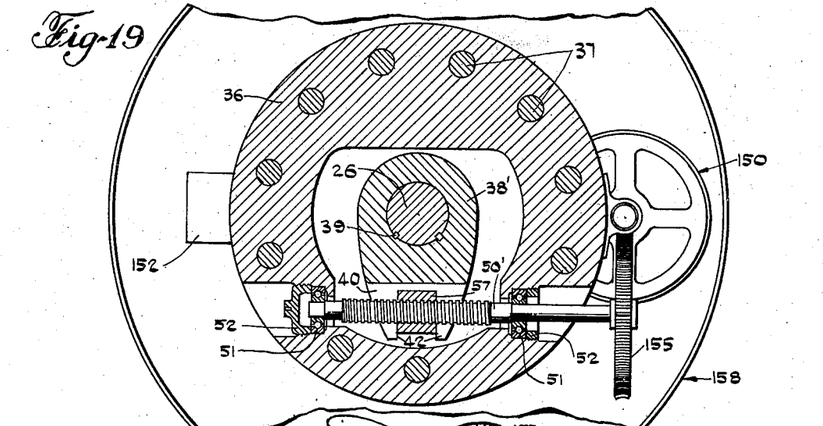
Figure 20:
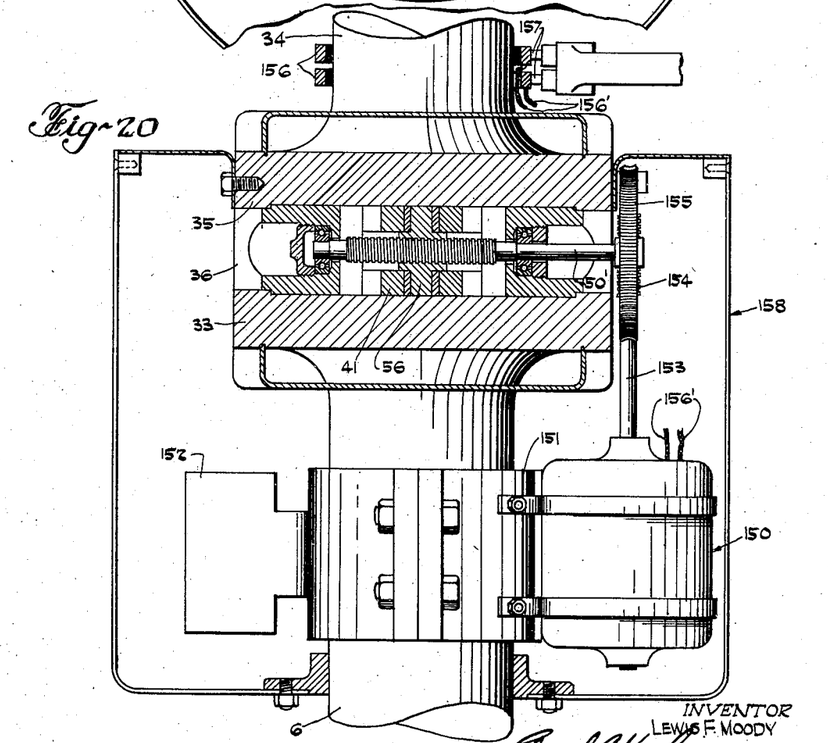

The modification shown in Figs. 19 and 20 provides means for actuating the screw 50' in the Fig. 6 modification by an electric motor 150, carried in a suitable bracket 151, clamped around the turbine shaft 6. The operating structure including the hub and arm mechanism 38', secured to shaft 26, is generally similar to the Fig. 6 form except for the omission of the locking mechanism 44, 45, the remaining corresponding parts of the two forms having the same reference numbers. A counter weight 152 is also carried by bracket 151 in diametrically-opposed relation to the motor 150. The armature shaft 153 is connected to the screw 50' by a worm 154 and worm gear 155, it being noted that the screw 50' differs from screw 50 merely by the omission of the lock bolts 54, and having the screw 50 extend outwardly so as to carry the worm gear 155. The worm and worm gear together constitute sufficient locking mechanism to prevent movement of the blades when not being adjusted. To permit blade adjustment during runner rotation, current to the electric motor may be supplied from two or more slip rings 156 connected to the motor by suitable wires 156' and to a source of current supply through stationary brushes 157 carried by any suitable stationary bracket. The lead wires to the brushes 157 may be connected to a manually-operable reversing switch so as to obtain blade adjustment in opposite directions, or the wires may be connected to a suitable governor-controlled mechanism. The motor, coupling and associated elements are enclosed in a suitable cylindrical housing 158 which is preferably split and held in a suitable manner by flanges and screws, to the coupling and runner shaft.

In any of the operating means using exclusively fluid-pressure actuation, governor control may be applied by controlling rotation of the motor valve through a collar mounted on the valve stems 78 or 147 and having cam grooves co-operating with an oscillatable arm actuated by the speed governor such as is shown in my copending application Serial No. 631,985. By this arrangement, reciprocation of the governor-controlled arm will cause oscillation of the motor valve to control the motor fluid in the same manner as if hand controlled. In the case of the electric motor actuation, current supply to the motor may be governor controlled by substituting for the usual governor pilot valve a reversible switch or rheostat control actuated by the usual governor mechanism; or, if it is desired to actuate both the runner blades and wicket gates simultaneously, the switch or rheostat mechanism may simply be attached to the pilot valve stem for movement therewith, it being understood that the pilot valve moves in opposite directions from a neutral position in accordance with the direction of blade adjustment. It is thus seen that any reversible switch mechanism connected to the stem would be thrown in accordance with the desired direction of blade adjustment, and would cause actuation of the electric motor accordingly.

Figure 21:
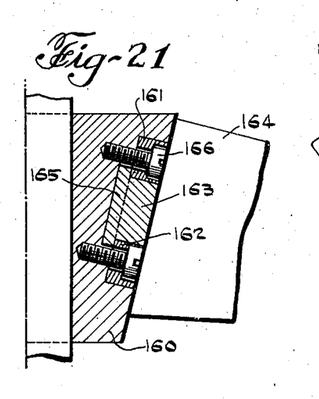
Figs. 21 to 25 show improved means for supporting the runner blades.
Figure 22:
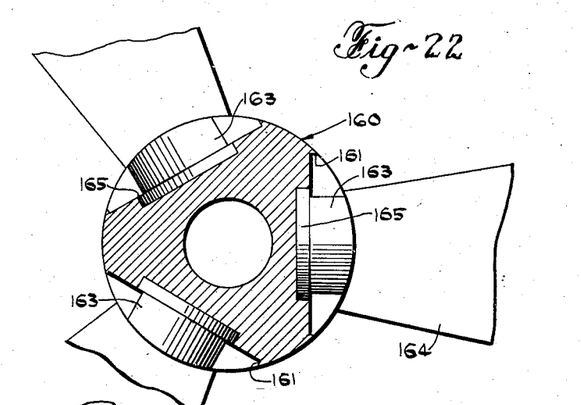
Figure 23:
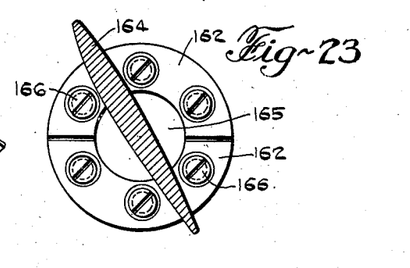

Referring to Figs. 21 to 23 the hub 160 is provided with three circular recesses 161 in which are fitted annular clamping rings 162 within which in turn are rotatably fitted discs 163 of vanes 164. Each clamping ring 162 is in separate halves. Each disc 163 has an enlarged head portion 165 engaged by the inner edge of the clamping ring 162 and bolts 166 are provided to press the clamping ring and against said head 165 to grip the latter against the bottom of the recess 161 and thus securely hold the runner section against rotation from its adjusted position. The enlarged pintles provided by the discs 165, 163 not only give an extended surface for the fitting of the rotatable parts but also provide a large area at the surface of connection of the disc with the blade so as to attain a strong construction.

Figure 24:
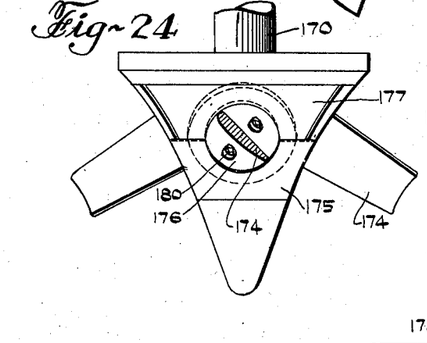
Figure 25:
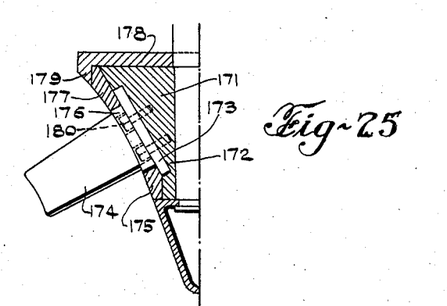

In the runner shown in Figs. 24 and 25, a shaft 170 carries a central hub portion 171 of general conical form keyed to the tapering end of the shaft. The hub portion 171 has a series of four circular recesses 172 in which are rotatably fitted the discs 173 of the blade sections having vanes 174. A lower holding ring 175 is fitted to the lower half of the hub portion 171 and has its upper edge horizontal and cut out in semi-circular form fitted to the periphery of the secondary discs 176 of the blade sections and overhanging the lower halves of the main discs 173. Fitted to the upper half of the hub section 171 is a series of segmental plates 177 each of which has its lower edge cut out in a semi-circle meeting with the corresponding semi-circle of the lower ring 175 and fitting the remaining half of the secondary disc 176. A cap member 178 having a depending flange 179 fits over the top of the hub portion 171 and retains the plates 177 by their engagement under the flange 179. Locking bolts 180 are provided passing through slots in discs 176, 173 and serving to clamp the disc and blade section securely in adjusted position.

It is thus seen that in the various modifications, or modes of operation above explained and described I have provided a very effective means for adjusting the gates, and one which is certain in operation and adapted to effectively resist wear, thereby eliminating clamping devices such as have heretofore been proposed or used.

Various modifications and arrangements of construction certain of which are herein described and shown may be employed without departing from the spirit of my invention as set forth in the appended claims of this application which is a continuation in part of my copending applications, Ser. No. 631,985, filed April 14, 1923, and Patent No. 1,741,787, issued December 31, 1929, filed April 15, 1922, this present application being directed to the improved form of operating mechanism for the adjustable runner blades and also to the improved means for adjustably supporting the runner blades.

I claim:

1. A hydraulic turbine runner comprising, in combination, a hub carrying adjustable blades, adjusting mechanism for said blades including an operating member common to a plurality of said blades, and relatively movable elements interacting along a plane surface contact for connecting said blades and member.

2. The combination comprising a hydraulic turbine runner having pivotally adjustable blades, and adjusting mechanism therefor including a rotatable member common to a plurality of said blades, and relatively movable elements interacting along surface contact for connecting said blades and member, the axes about which said member and blades rotate intersecting.

3. The combination comprising a hydraulic turbine runner having a hub provided with pivotally adjustable blades, and adjusting mechanism therefor including a rotatable operating member, and relatively movable elements interacting along surface contact for connecting said blades and member, one of said elements being a pivot pin, the axes of the blades, pivot pins and operating member intersecting at a common point.

4. The combination comprising a hydraulic turbine runner having a hub carrying pivotally adjustable blades, and adjusting mechanism therefor comprising a central rotatable operating rod, an arm secured to each of said blades, and a pin and slot mechanism for connecting said arms to said central operating member.

5. The combination comprising a hydraulic turbine runner having a hub carrying pivotally adjustable blades, and adjusting mechanism therefor comprising a central rotatable operating rod, an arm secured to each of said blades, and a pin and slot mechanism for connecting said arms to said central operating member, said pin pivotally carrying a block slidable in said slot and adapted to be maintained in surface contact therewith for any adjusted position of the blades.

6. The combination in a hydraulic turbine runner comprising a hub carrying a plurality of pivotally adjustable blades, means forming peripheral and radial bearing surfaces for each of said blades, each blade having surfaces cooperating with said respective bearing surfaces, and including an element having a flange disposed on the inner side of said radial surface thereby resisting outward displacement of the blade while each blade is provided with a hub whose periphery is supported by said peripheral bearing surface.

7. A hydraulic turbine runner comprising in combination a hub having recesses each provided with a cylindrical bearing surface, adjustable blades carried by said hub and each having a circular flange or hub member disposable in its respective recess so that the periphery of the flange member is engageable with the bearing surface of the recess, a member carried by and rigid with said runner hub, and means whereby each blade also has a radial flange engageable with the inner side of said rigid member.

8. A hydraulic turbine runner comprising in combination a hub carrying pivotally adjustable blades, a radially flanged member carried by each of said blades, and means for supporting each of said blades including a cylindrical recess formed in said hub, a cylindrical flange member carried by each of said blades and disposed in said recess for engagement with the periphery thereof, and means providing an inner surface fixed with respect to said hub and engageable by said radially flanged member.

9. A hydraulic turbine runner comprising in combination a hub carrying a plurality of pivotally adjustable blades, a member rigid with said hub and having a bearing surface, and means for supporting each of said blades including a radially flanged member engageable on its outer radial surface with said bearing surface of said rigid member and removable threaded bolts passing through one of said members for holding said surfaces in operative relation.

10. A hydraulic turbine runner comprising in combination a hub carrying pivotally adjustable blades, means for supporting each of said blades including a cylindrical recess and a reduced opening extending inwardly therefrom through a wall, a disc carried by the blade and disposed in said recess, and a plate bolted to said disc and overhanging the inner surface of said wall through which said opening passes, said plate including means extending through said opening and engaging said disc.

11. A hydraulic turbine runner comprising in combination a hub carrying pivotally adjustable blades, means for supporting each of said blades including a cylindrical recess and a reduced opening extending inwardly therefrom, a disc carried by the blade and disposed in said recess, a plate bolted to said disc and overhanging the inner surface of a wall through which said opening passes, said plate including means extending through said opening and engaging said disc, and an operating arm removably carried by said plate.

12. A hydraulic turbine runner comprising in combination a hub carrying a plurality of pivotally adjustable blades, means for supporting and operating each of said blades including a peripheral bearing surface and an inner radial surface each formed in said hub, a member journaled in said peripheral bearing, a flanged member removably carried by said blade and adapted for engagement with said inner radial surface, and an operating arm removably carried by said flanged member, whereby each of said plurality of blades may be assembled in said hub with its respective flanged member but without its respective operating arm.

13. A hydraulic turbine runner comprising in combination a hub having a hollow interior and carrying adjustable blades, means for supporting and operating said blades, including blade-supporting bearings, and means secured to said blades from within said hollow interior to hold said blades in an operative relation to said hub, an operating arm secured to each of said holding means and being removable therefrom in a downward direction, whereby said blades may be assembled in an operative relation to said hub prior to the assembly of said arms.

14. A hydraulic turbine runner comprising in combination a hub having a hollow interior and carrying a plurality of pivotally adjustable blades, actuating means for effecting adjustment of said blades, including a central rotatable operating member, a transverse support carried by the lower end of said hub, and a bearing for said operating member carried by said support.

15. A hydraulic turbine runner comprising in combination a hub having a hollow interior and carrying a plurality of pivotally adjustable blades, operating means for effecting adjustment of said blades including a central rotatable operating rod, and means for supporting said rod, including a closure member for said hollow interior carried by the lower end of said hub, said closure member being provided with an upwardly extending stub shaft, and a member carried by the lower end of said central operating rod and engaging the periphery of said stub shaft for bearing support.

16. The combination comprising a hydraulic turbine having a runner provided with adjustable blades, a turbine shaft provided with a coupling, and means for effecting adjustment of said blades, including operating means associated with and wholly contained within said coupling, said operating means having a member fixed to said shaft, an actuating member and an element intermediate of and movable relative to said members for effecting cooperation therebetween.

17. The combination comprising a hydraulic turbine having a runner provided with adjustable blades, a shaft for supporting said runner, a second shaft, a coupling for connecting said shafts including a flanged member carried by each of the same, a hollow removable spacing member between said flanged members, and means for effecting adjustment of said blades including operating means disposed within the hollow portion of said spacing member and supported entirely thereby.

18. The combination comprising a hydraulic turbine having a runner provided with adjustable blades, a shaft for supporting said runner, a second shaft, a coupling for connecting said shafts including a flanged member carried by each of the same, a hollow spacing member between said flanged members, and means for effecting adjustment of said blades including operating means disposed within the hollow portion of said spacing member, an operating element extending through at least a portion of said spacing member to permit actuation thereof from the exterior, and means cooperating with said element for effecting an axial locking force thereon.

19. The combination comprising a hydraulic turbine having adjustable blades and a hollow shaft, a second shaft, a coupling for connecting said shafts, and means for adjusting said blades including operating mechanism disposed within said coupling and a screw disposed transversely of the shaft axis, a rod extending through the hollow portion of said shaft, and means movable relative to connecting said screw and rod for operatively connecting the same together.

20. The combination in a hydraulic turbine comprising a runner having adjustable blades, a shaft for supporting said runner provided with a coupling, and a blade-position indicating mechanism carried by said coupling and having its indicating element movable externally thereof.

21. The combination in a hydraulic turbine comprising a runner having adjustable blades, a shaft for supporting said runner, and a rotatable blade-position indicating member associated with said shaft and rotating about an axis offset from the shaft axis.

22. The combination in a hydraulic turbine comprising a runner provided with adjustable blades, a shaft for supporting said runner, and means for indicating the position of said blades including a dial oscillatable on a shaft disposed substantially parallel to the axis of the runner shaft and rotatable therewith.

23. The combination in a hydraulic turbine comprising a runner having adjustable blades, a hollow shaft for supporting said runner, blade-adjusting mechanism disposed within said runner, and operating means for said adjusting mechanism including a rod extending through the hollow portion of said shaft, a screw disposed transversely of the axis of said shaft and rotatable therewith, said screw being substantially axially fixed, and an arm secured to said rod and carrying a nut mounted on said screw for movement relative thereto upon actuation thereof.

24. The combination in a hydraulic turbine comprising a runner having adjustable blades, a mechanism for effecting adjustment of said blades including a screw carried by and disposed transversely of said runner shaft, and means for enclosing the end of said screw including a stud extending through said closure member and threaded into the end of said screw.

LEWIS FERRY MOODY.